United States Patent
Akai et al.

(10) Patent No.: US 10,272,760 B2
(45) Date of Patent: Apr. 30, 2019

(54) WORK VEHICLE

(71) Applicant: Kubota Corporation, Osaka (JP)

(72) Inventors: Yuto Akai, Sakai (JP); Nobuyuki Yamashita, Sakai (JP); Takashi Shibata, Sakai (JP); Koichiro Matsumoto, Sakai (JP); Masahiro Izumi, Sakai (JP)

(73) Assignee: Kubota Corporation, Osaka (JP)

( * ) Notice: Subject to any disclaimer, the term of this patent is extended or adjusted under 35 U.S.C. 154(b) by 6 days.

(21) Appl. No.: 15/606,029

(22) Filed: May 26, 2017

(65) Prior Publication Data
US 2018/0065457 A1    Mar. 8, 2018

(30) Foreign Application Priority Data
Sep. 2, 2016  (JP) ................. 2016-171965

(51) Int. Cl.
| | |
|---|---|
| *B60K 1/04* | (2006.01) |
| *B62D 1/04* | (2006.01) |
| *B62D 1/16* | (2006.01) |
| *A01D 34/64* | (2006.01) |
| *B60R 16/04* | (2006.01) |

(52) U.S. Cl.
CPC ............. *B60K 1/04* (2013.01); *A01D 34/64* (2013.01); *B60R 16/04* (2013.01); *B62D 1/04* (2013.01); *B62D 1/16* (2013.01); *B60K 2001/0405* (2013.01); *B60K 2001/0411* (2013.01); *B60K 2001/0466* (2013.01); *B60Y 2200/221* (2013.01); *B60Y 2200/223* (2013.01)

(58) Field of Classification Search
CPC ............. B60K 1/04; B60K 2001/0411; B60K 2001/0405; B60K 2001/0466; B62D 1/04; B62D 1/16; B60Y 2200/221; B60Y 2200/223; A01D 34/64; B60R 16/04
USPC ........................................................ 180/68.5
See application file for complete search history.

(56) References Cited

U.S. PATENT DOCUMENTS

| | | | | |
|---|---|---|---|---|
| 5,660,244 A | * | 8/1997 | Matsuda ................ | B60K 11/04 180/68.1 |
| 5,887,671 A | * | 3/1999 | Yuki ...................... | B60K 11/08 180/68.1 |
| 6,438,930 B1 | | 8/2002 | Velke et al. | |
| 7,558,658 B2 | * | 7/2009 | Kuramoto .............. | B62D 25/10 180/291 |
| 8,205,701 B2 | * | 6/2012 | Kuramoto .............. | B62D 25/10 180/291 |
| 9,937,779 B2 | * | 4/2018 | Koike ..................... | B60K 1/02 |
| 2006/0243505 A1 | | 11/2006 | Kuramoto et al. | |
| 2015/0083506 A1 | | 3/2015 | Koike et al. | |

FOREIGN PATENT DOCUMENTS

JP   2011126531 A   6/2011

* cited by examiner

*Primary Examiner* — John D Walters
(74) *Attorney, Agent, or Firm* — The Webb Law Firm (57) ABSTRACT

A work vehicle includes a front control tower provided forwardly of a driver's seat, a battery accommodated inside the front control tower, and a bottom member that provides a bottom of the front control tower. The battery is mounted on the bottom member.

14 Claims, 9 Drawing Sheets

WORK VEHICLE

CROSS-REFERENCE TO RELATED APPLICATION

This application claims priority to Japanese Patent Application No. 2016-171965 filed Sep. 2, 2016, the disclosure of which is hereby incorporated in its entirety by reference.

BACKGROUND OF THE INVENTION

1. Field of the Invention

This invention relates to a work vehicle such as a tractor. More particularly, the invention relates to a work vehicle having a driver's seat to be seated by a driver, a front control tower provided forwardly of the driver's seat and a battery accommodated inside the front control tower.

2. Description of Related Art

In a work vehicle disclosed in JP2011-126531A, a battery is accommodated inside a front control tower ("panel cover" and "center cover" in JP2011-126531A).

With this work vehicle, the battery is mounted on a frame structure. There remains room for improvement in that the mounting arrangement of the battery is complicated. Namely, there is a need for simplification of battery mounting arrangement.

SUMMARY OF THE INVENTION

In view thereof, there is proposed a work vehicle comprising:
- a driver's seat to be seated by a driver;
- a front control tower provided forwardly of the driver's seat;
- a battery accommodated inside the front control tower; and
- a bottom member that provides a bottom of the front control tower, the battery being mounted on the bottom member.

With this arrangement, by mounting the battery with utilizing the bottom member, the battery mounting arrangement can be simplified.

In one preferred embodiment, the bottom member includes a mounting member on which the battery is mounted, and a separate member separable from the mounting member when the battery is mounted on the mounting member. With this above arrangement, when a maintenance operation is to be effected for instance, this maintenance operation can be effected easily by separating the separate member from the mounting member, without trouble of detaching the battery from the bottom member.

In another preferred embodiment, the separate member is releasably connected to the mounting member by a connector device when the separate member is superposed on the mounting member. With this arrangement, when the separate member is to be separated from the mounting member, the separate member can be easily separated from the mounting member without being interfered by the mounting member.

In another preferred embodiment, the work vehicle further comprises: a steering wheel disposed erect on the front control tower for steering operation of a vehicle body; and a steering-wheel post that supports the steering wheel, wherein the steering-wheel post includes a pair of right and left leg portions that extend in a vertical direction through the bottom member, the bottom member being separable into the mounting member and the separate member at a portion where one of the leg portions extend through the bottom member. With this arrangement, when the separate member is to be separated from the mounting member, the separate member can be readily separated from the mounting member without being interfered by the leg portions.

In another preferred embodiment, the work vehicle further comprises a step that is provided between the front control tower and the driver's seat, a front end portion of the step being superposed on a rear end portion of the mounting member.

In another preferred embodiment, the work vehicle further comprises a step that is provided between the front control tower and the driver's seat, wherein: the separate member includes a left separate member on the left side of the mounting member and a right separate member on the right side of the mounting member; the left separate member covers a gap between a left side portion of the mounting member and a front end portion of the step; and the right separate member covers a gap between a right side portion of the mounting member and the front end portion of the step.

In another preferred embodiment, the front control tower includes a detachable lower panel for covering the battery from the driver's seat side, and the member includes a guide portion for guiding attachment/detachment of the lower panel.

In another preferred embodiment, the work vehicle further comprises: a steering wheel disposed erect on the front control tower for steering operation of a vehicle body; and a steering-wheel post that supports the steering wheel; wherein the steering-wheel post has an inverted U-letter shape comprising a pair of right and left leg portions that extend in a vertical direction through the bottom member and a connecting portion interconnecting the respective leg portions across the battery; and in each of the leg portions, there is formed a connecting element to which a stay of the battery is to be fixed.

Further and other features and advantages achieved thereby will become apparent from the following explanation.

DETAILED DESCRIPTION OF THE PREFERRED EMBODIMENTS

In the following description, a direction of arrow "F" shown in FIG. 1 and FIG. 2 will represent "vehicle body front side"; and a direction of arrow "B" shown in FIG. 1 and FIG. 2 will represent "vehicle body rear side". A direction of arrow "L" shown in FIG. 2 will represent "vehicle body left side"; and a direction arrow "R" in FIG. 2 will represent "vehicle body right side".

[General Arrangement of Tractor]

Figure 1:
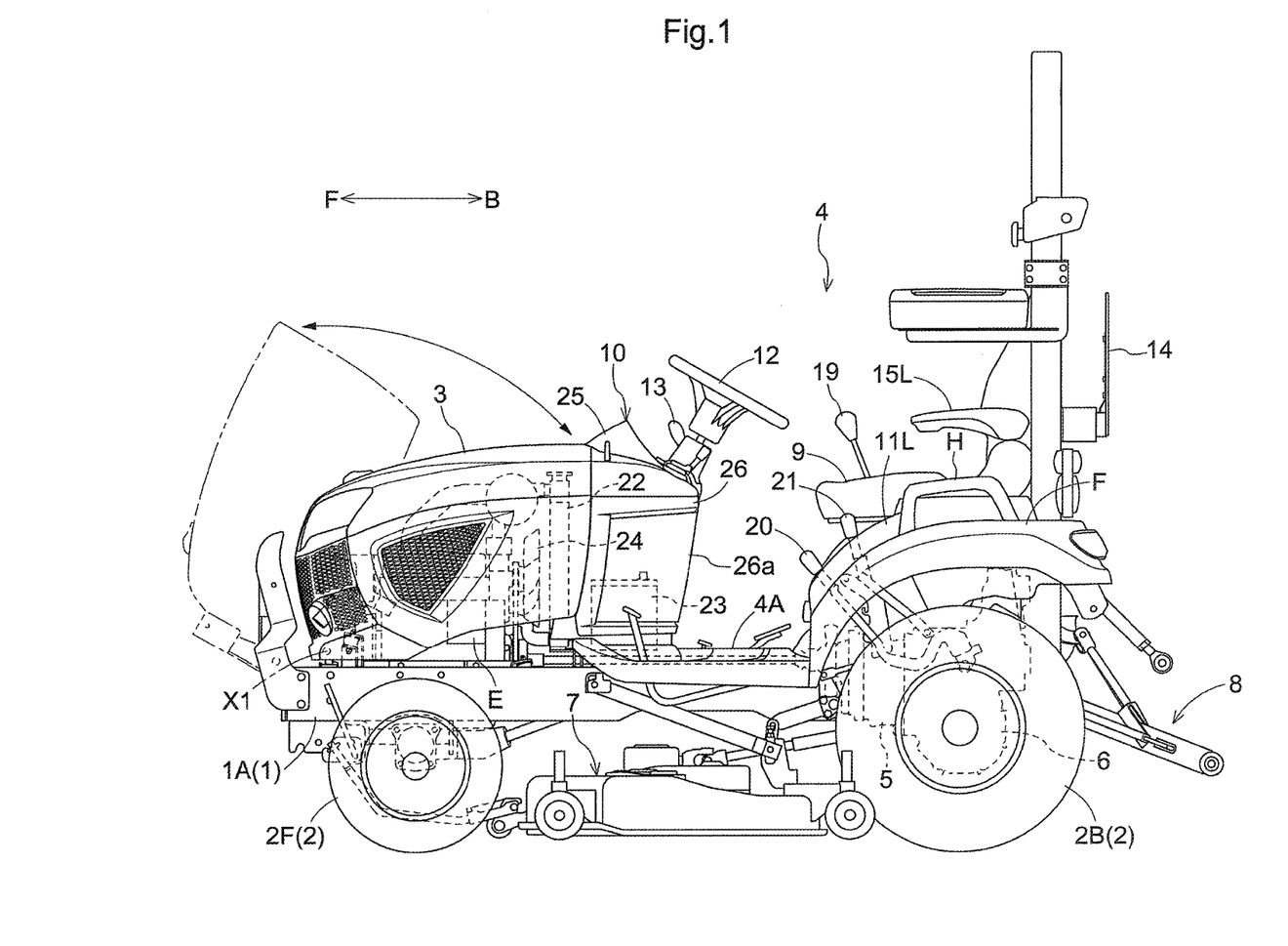
FIG. 1 is a left side view showing a tractor as an example of a work vehicle.
Figure 2:
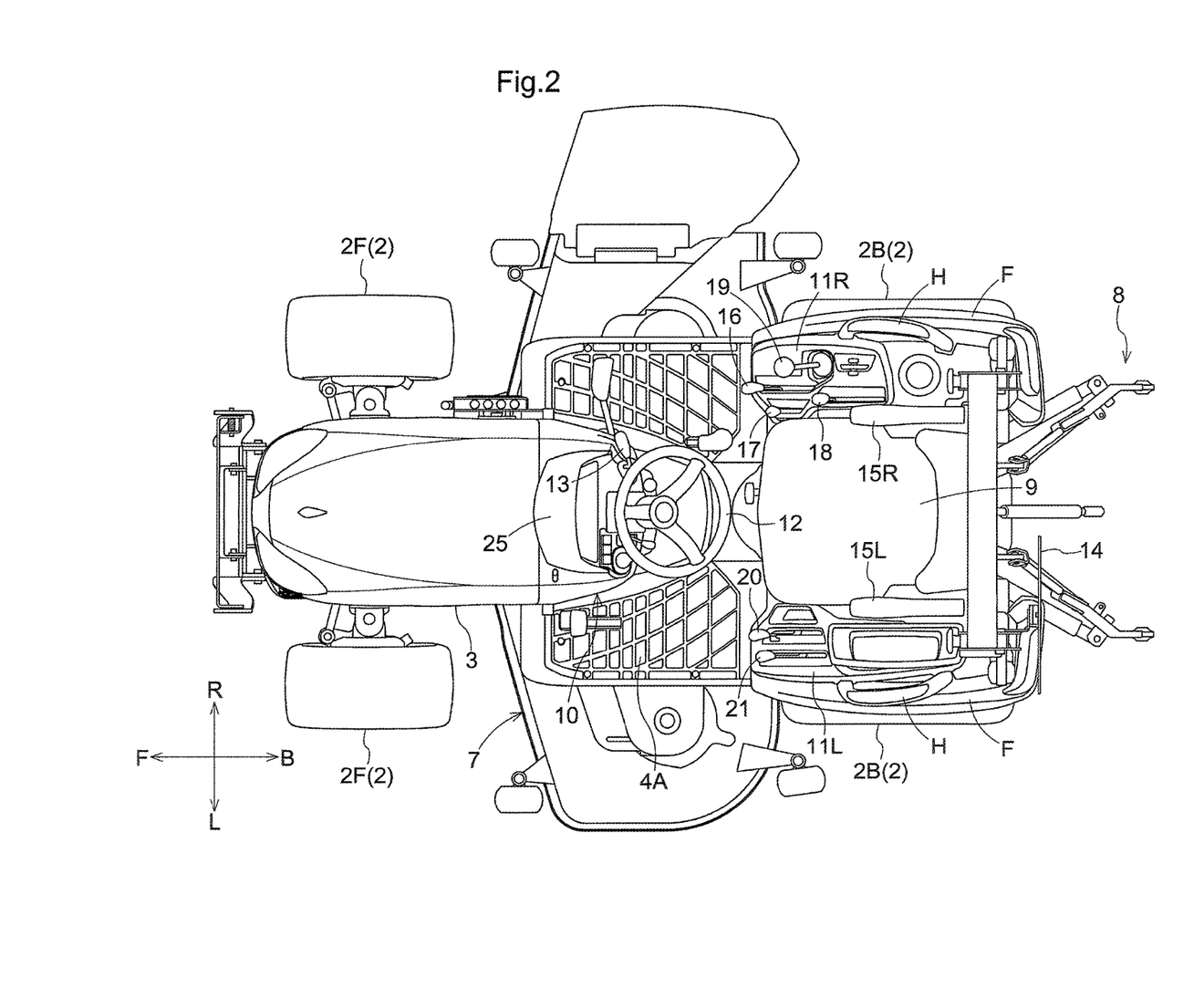
FIG. 2 is a plan view showing the tractor.

FIG. 1 and FIG. 2 show a tractor (an example of a "work vehicle"). This tractor includes a vehicle body frame 1; and a wheel type traveling device 2 supporting the vehicle body frame 1. The traveling device 2 includes a pair of right and left steerable and drivable front wheels 2F and a pair of right and left drivable rear wheels 2B. A pair of right and left fenders F for covering the rear wheels 2B are provided. Each fender F includes a handrail H acting as a handle to be gripped by a driver when the driver gets on/off the vehicle.

A hood 3 is provided at a front half portion of the vehicle body frame 1. Inside the hood 3, an engine E, a radiator 22 and a cooling fan 24 are accommodated. The hood 3 is vertically pivotable about a front pivot X1 between a closing position for covering the engine E and an opening position for exposing the engine E to the outside.

A driving section 4 is provided at a rear half portion of the vehicle body frame 1. A hydrostatic stepless speed changer device 5 acting as a main speed changer device, and a transmission case 6 are further provided at the rear half portion of the vehicle body frame 1. The transmission case 6 accommodates e.g. a gear type speed changer device (not shown) acting as an auxiliary speed changer device.

To this tractor, a front loader (not shown) can be attached. Under the vehicle body frame 1 and between the front wheels 2F and the rear wheels 2B, a mower 7 is attached to be lifted up/down. At a rear end portion of the vehicle body frame 1, there is provided a link mechanism 8 that allows attachment of an implement (not shown) such as a rotary tiller, etc.

For driving the mower 7, a driving power of the engine E can be taken off via a mid PTO shaft (not shown). For driving the implement, with this tractor, a driving power from the engine E can be taken off via a rear PTO shaft (not shown). This tractor includes a PTO clutch (not shown) switchable between a transmitting state for transmitting the driving power from the engine E to the rear/mid PTO shaft, and a non-transmitting state for interrupting the driving power from the engine E to the rear/mid PTO shaft.

[Driving Section]

As shown in FIGS. 1 through 4, the driving section 4 includes a driver's seat 9 where a driver is to be seated, a front panel 10 (an example of a "front control tower"), a right lever guide 11R and a left lever guide 11L. On a left rear side of the driver's seat 9, there is provided an alarm reflecting board 14 for alarming to the rear side of the vehicle. On a floor portion of the driving section 4, a step 4A is provided.

The driver's seat 9 includes a left armrest 15L on which a driver's left arm is to rest, and a right armrest 15R on which a driver's right arm is to rest. Each of the left armrest 15L and the right armrest 15R is vertically pivotable about a rear pivot between a used position where the armrest 15L/15R extends along the vehicle body front/rear direction and a stored position where the armrest 15L/15R extends along the vertical direction.

The left lever guide 11L is provided on an upper face of the left fender F. The left lever guide 11L is provided with a PTO clutch lever 20 for switching the PTO clutch, and a PTO selecting lever 21 for selecting a PTO shaft to be driven.

The right lever guide 11R is provided on an upper face of the right fender F. The right lever guide 11R is provided with an auxiliary speed changer lever 16 for speed-changing the auxiliary speed changer device; a switching lever 17 for switching the traveling device 2 between a four-wheel drive state and a two-wheel drive state; a lift lever 18 for lifting up/down the implement; and an operational lever 19 for operating the front loader.

The front panel 10 is provided forwardly of the driver's seat 9. The front panel 10 includes a steering wheel 12 for steering operations of the vehicle body, and an accelerator lever 13 for changing rotational speed of the engine E. The front panel 10 includes an upper panel 25, and a lower panel 26 detachably attachable to the upper panel 25. The lower panel 26 is provided with an air-permeable screen 26a. A battery 23 is provided inside the lower panel 26. A battery amount 27 (an example of a "bottom member") is disposed for providing a bottom portion of the lower panel 26. The battery 23 is mounted on the battery mount 27.

[Frame Arrangement]

Figure 3:
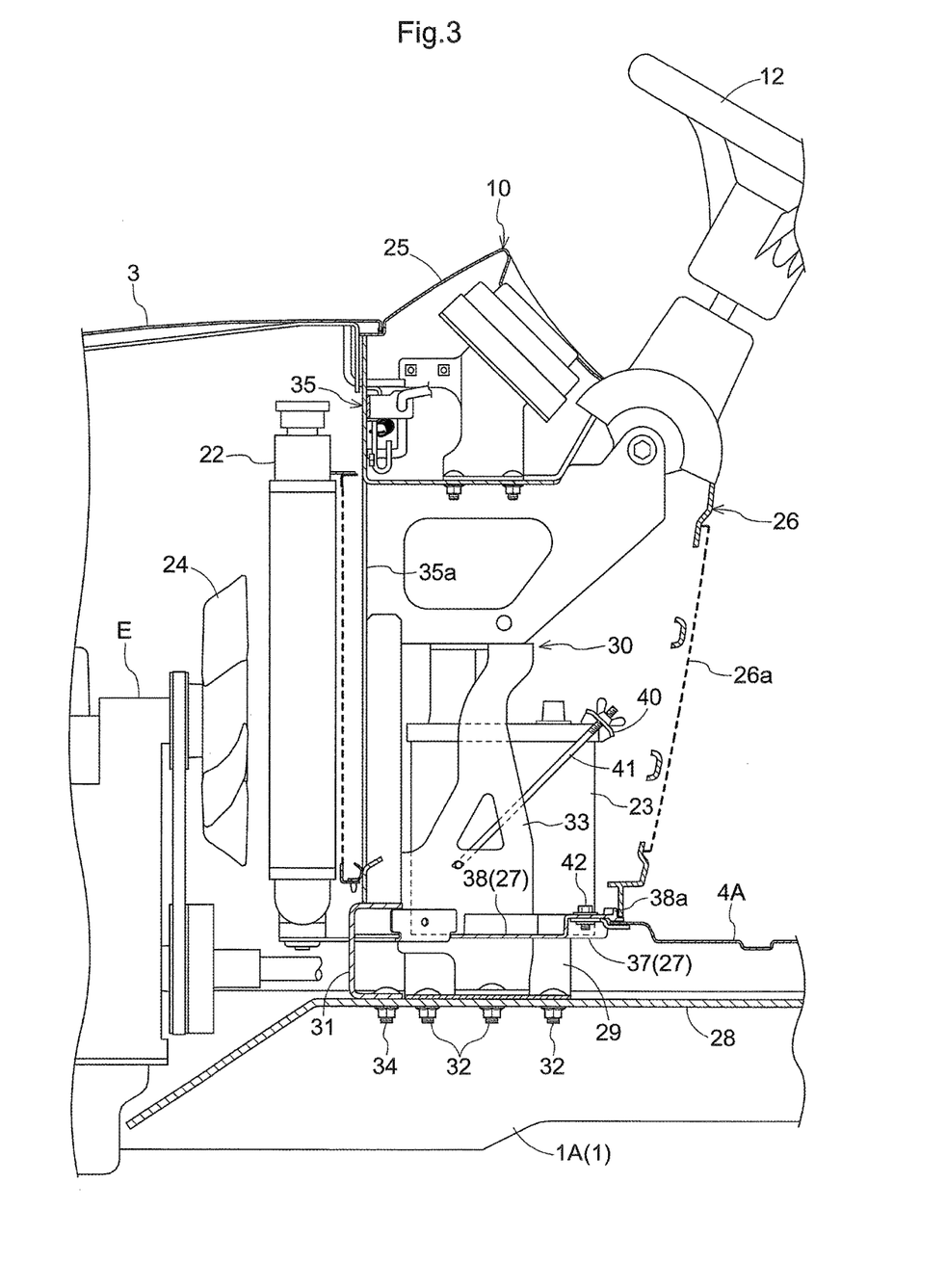
FIG. 3 is a left side view showing an inner arrangement of a front panel.
Figure 4:
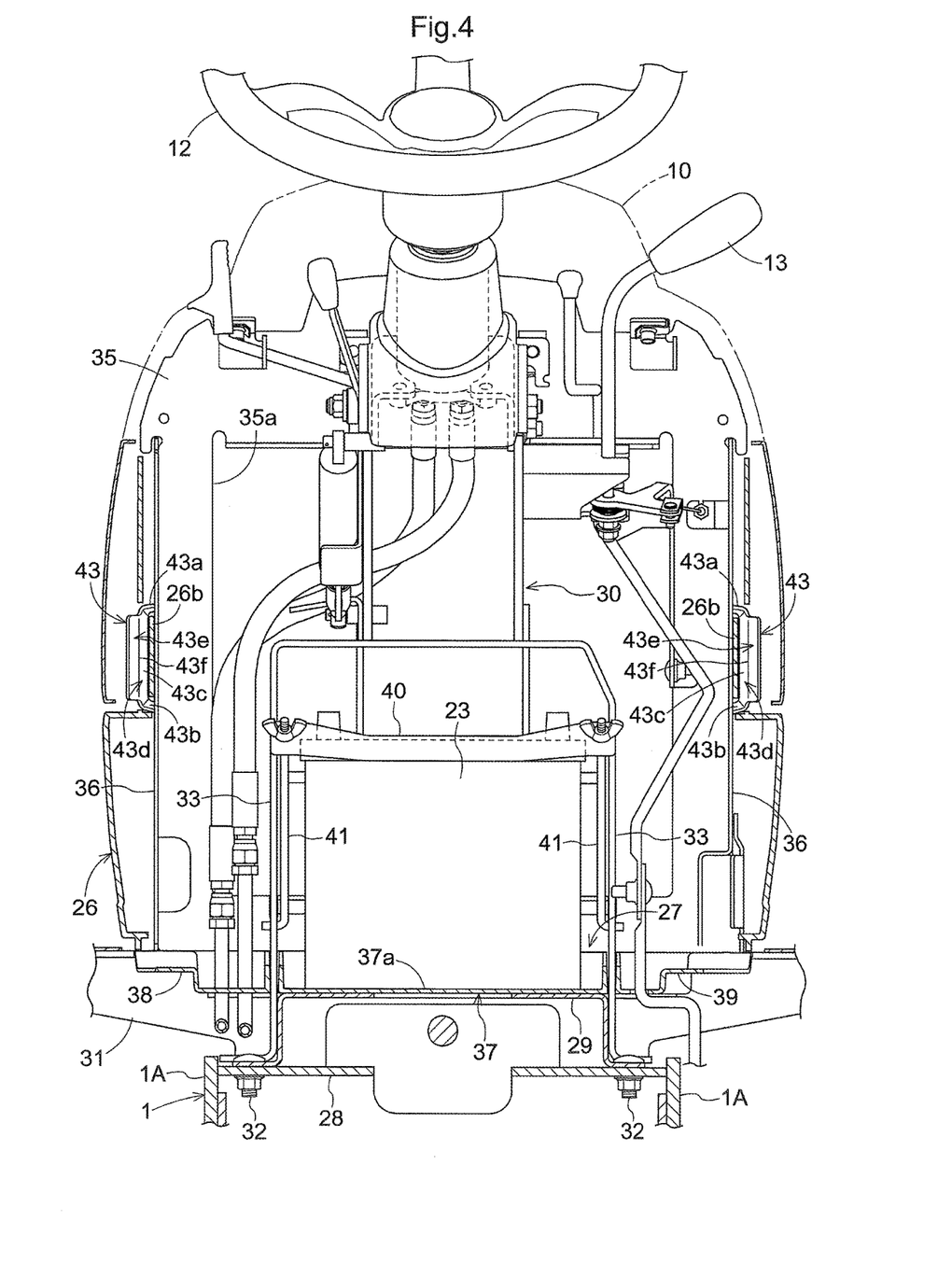
FIG. 4 is a rear view showing the inner arrangement of the front panel.
Figure 5:
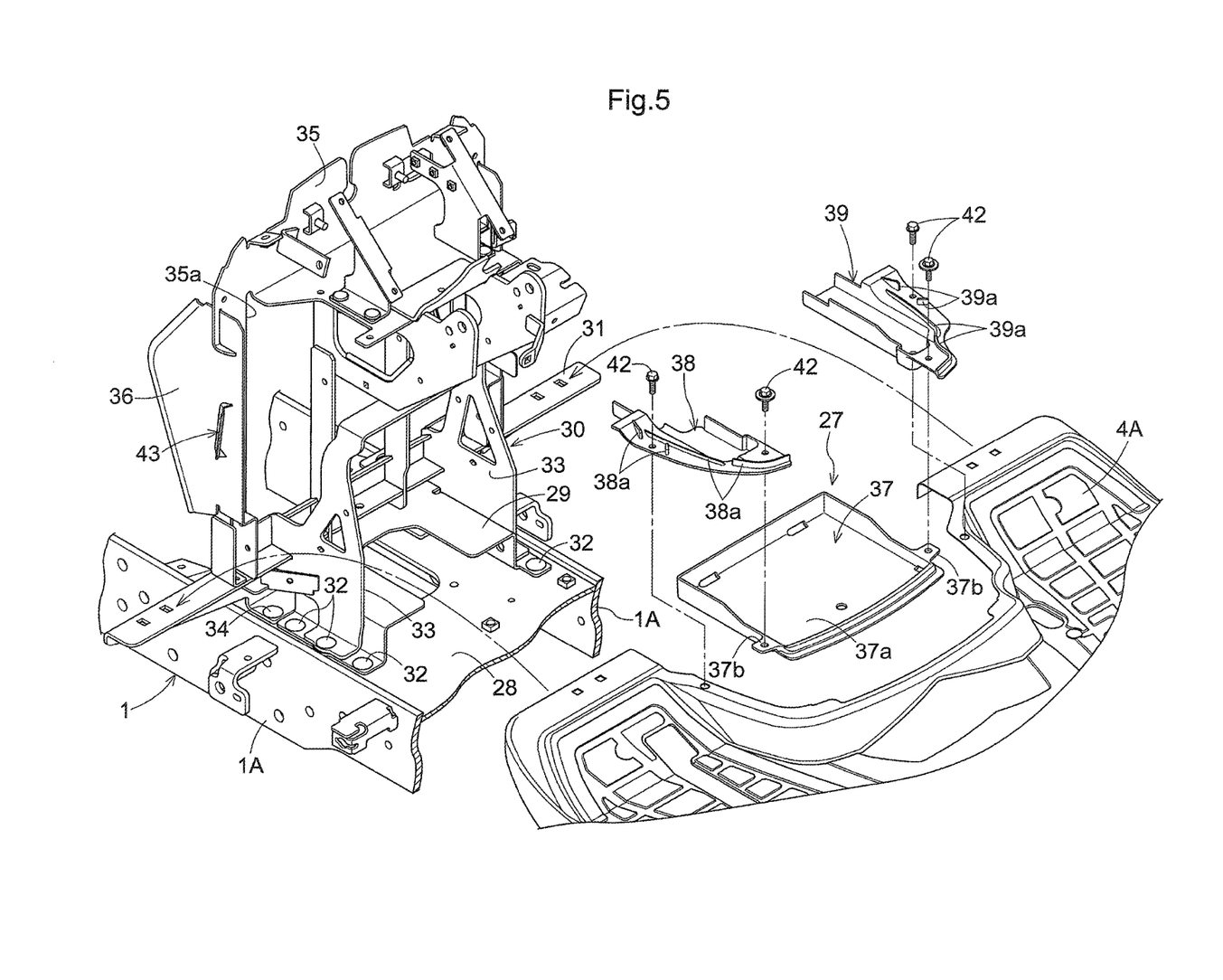
FIG. 5 is an exploded perspective view showing a frame structure, a battery mount and a step.

As shown in FIGS. 3 through 5, the vehicle body frame 1 includes a pair of right and left main frames 1A extending in a vehicle body front/rear direction. A center frame 28 extends between the pair of right and left main frames 1A. On the center frame 28, a base 29, a steering-wheel post 30 and a transverse frame 31 extending in the vehicle body right/left direction are provided. The base 29 supports the battery mount 27. The base 29 is fixed to the center frame 28 with bolts 32.

The steering-wheel post 30 supports the steering wheel 12. The steering-wheel post 30 includes a pair of right and left leg portions 33 that extend in the vertical direction through the battery mount 27. The leg portions 33 are fixed to the center frame 28 with the bolts 32.

The right and left end portions of the transverse frame 31 protrude to the vehicle body outer side from the right main frame 1A and the left main frame 1A. The transverse frame 31 is fixed to the center frame 28 with bolts 34. Front end portions of the step 4A are bolt-fixed to the right and left end portions of the transverse frame 31. A wall body 35 stands erect on the transverse frame 31. The wall body 35 defines a ventilation opening 35a for allowing passage of cooling air generated by the cooling fan 24. Side plates 36 extends from the right and left end portions of the wall body 35, respectively.

[Battery Mount]

As shown in FIGS. 5 through 9, the battery mount 27 includes a mounting member 37, a left separate member 38 (an example of a "separate member"), and a right separate member 39 (an example of the "separate member"). This battery mount 27 can be separated into the mounting member 37, the left separate member 38 and the right separate member 39 at portions thereof through which the respective leg portions 33 extend (namely, the battery mount 27 can be divided right and left into three parts).

The mounting member 37 is a shallow enclosure/pan member. The mounting member 37 includes a bottom plate portion 37a extending horizontal/flat for placing the battery 23 thereon. The battery 23, as being placed on the mounting member 37, is fixed in position via a stay 40 by a pair of right and left fixing rods 41. Each fixing rod 41 is fixed to the leg portion 33 of the steering-wheel post 30 associated therewith which leg portion 33 defines a connecting element therein with the fixing rod 41 (e.g. a connecting hole for receiving the distal end of the fixing rod 41). The mounting member 37 further includes a pair of right and left connecting members 37b to be described later in more detail. On a rear end portion of the mounting member 37, a front end portion of the stay 4A is superposed.

The left separate member 38 covers a gap between the left side portion of the mounting member 37 and the front end portion of the step 4A, so as to resist entrance of dust or the like to the inside of the front panel 10 from the lower side. The left separate member 38 can be separated from the mounting member 37 when the battery 23 is mounted on this mounting member 37. The left separate member 38 includes a left guide portion 38a configured to guide the lower panel 26 when this lower panel 26 is attached or detached.

The right separate member 39 covers a gap between the right side portion of the mounting member 37 and the front end portion of the step 4A, so as to resist entrance of dust or the like to the inside of the front panel 10 from the lower side. The right separate member 39 can be separated from the mounting member 37 when the battery 23 is mounted on this mounting member 37. The right separate member 39 includes a right guide portion 39a configured to guide the lower panel 26 when this lower panel 26 is attached or detached.

With the left separate member 38 being superposed on the left connecting portion 37b of the mounting member 37 and the front end portion of the step 4A, the left separate member 38 is connected with bolts 42 (an example of a "connector device") to the left connecting portion 37b of the mounting member 37 and the front end portion of the step 4A. For separating the left separate member 38 from the mounting portion 37, the connection with the bolts 42 will be released, whereby the left separate member 38 can be separated from the mounting member 37, with the battery 23 remaining mounted on this mounting member 37.

With the right separate member 39 being superposed on the right connecting portion 37b of the mounting member 37 and the front end portion of the step 4A, the right separate member 39 is connected with the bolts 42 to the right connecting portion 37b of the mounting member 37 and the front end portion of the step 4A. For separating the right separate member 39 from the mounting portion 37, the connection with the bolts 42 will be released, whereby the right separate member 39 can be separated from the mounting member 37, with the battery 23 remaining mounted on this mounting member 37.

With the above-described arrangements, when a maintenance operation is to be effected for instance, this maintenance operation can be carried out easily by separating the left separate member 38 and the right separate member 39 from the mounting member 37, without trouble of dismounting the battery 23 from the mounting member 37. Incidentally, if the fixing rods 41 are unfixed from the respective leg portions 33 of the steering-wheel post 30, the battery 23 can be removed from the mounting member 37.

[Attachment/Detachment of Front Panel]

Figure 6:
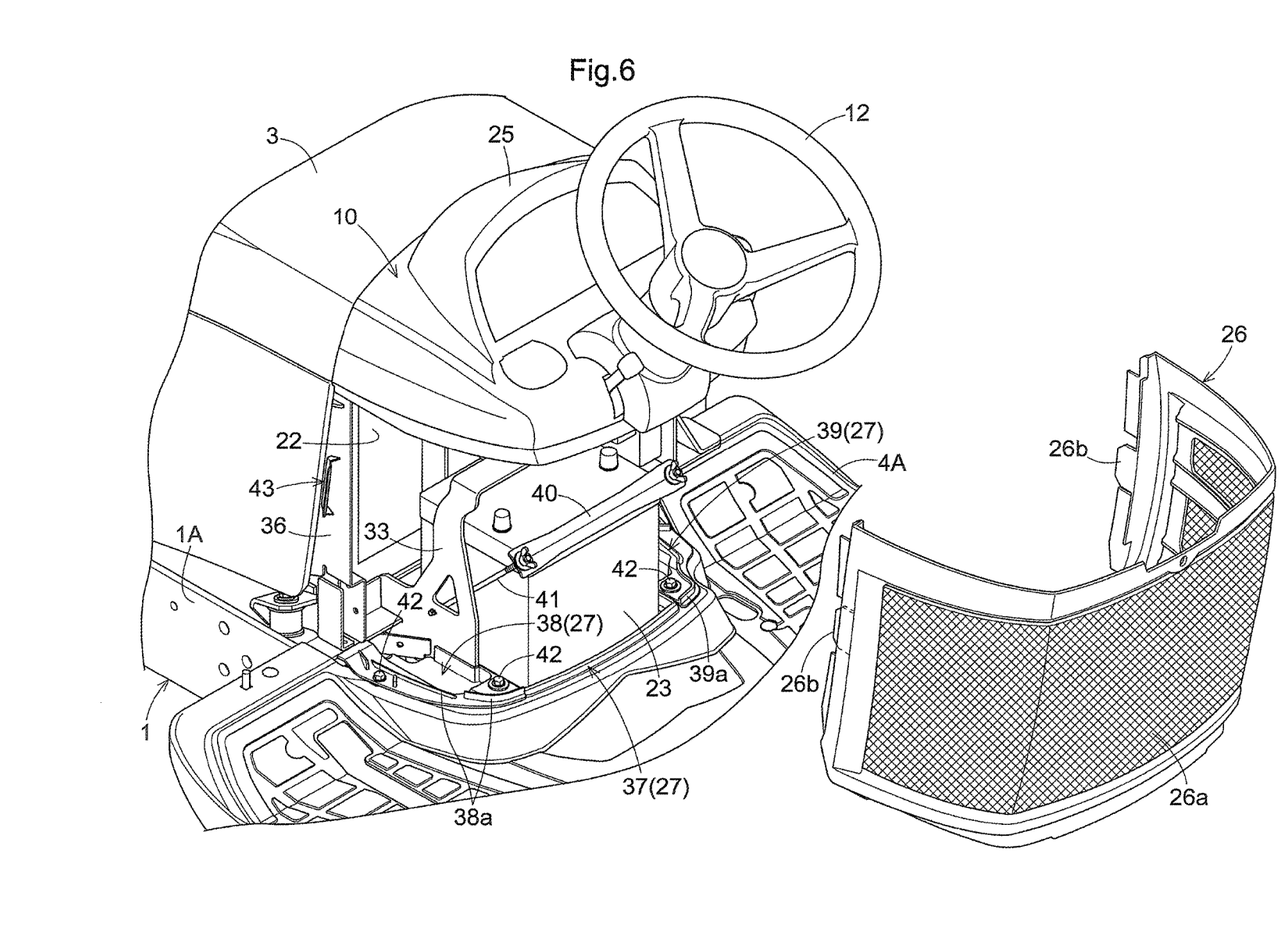
FIG. 6 is an exploded perspective view showing a state when a lower panel is removed.
Figure 7:
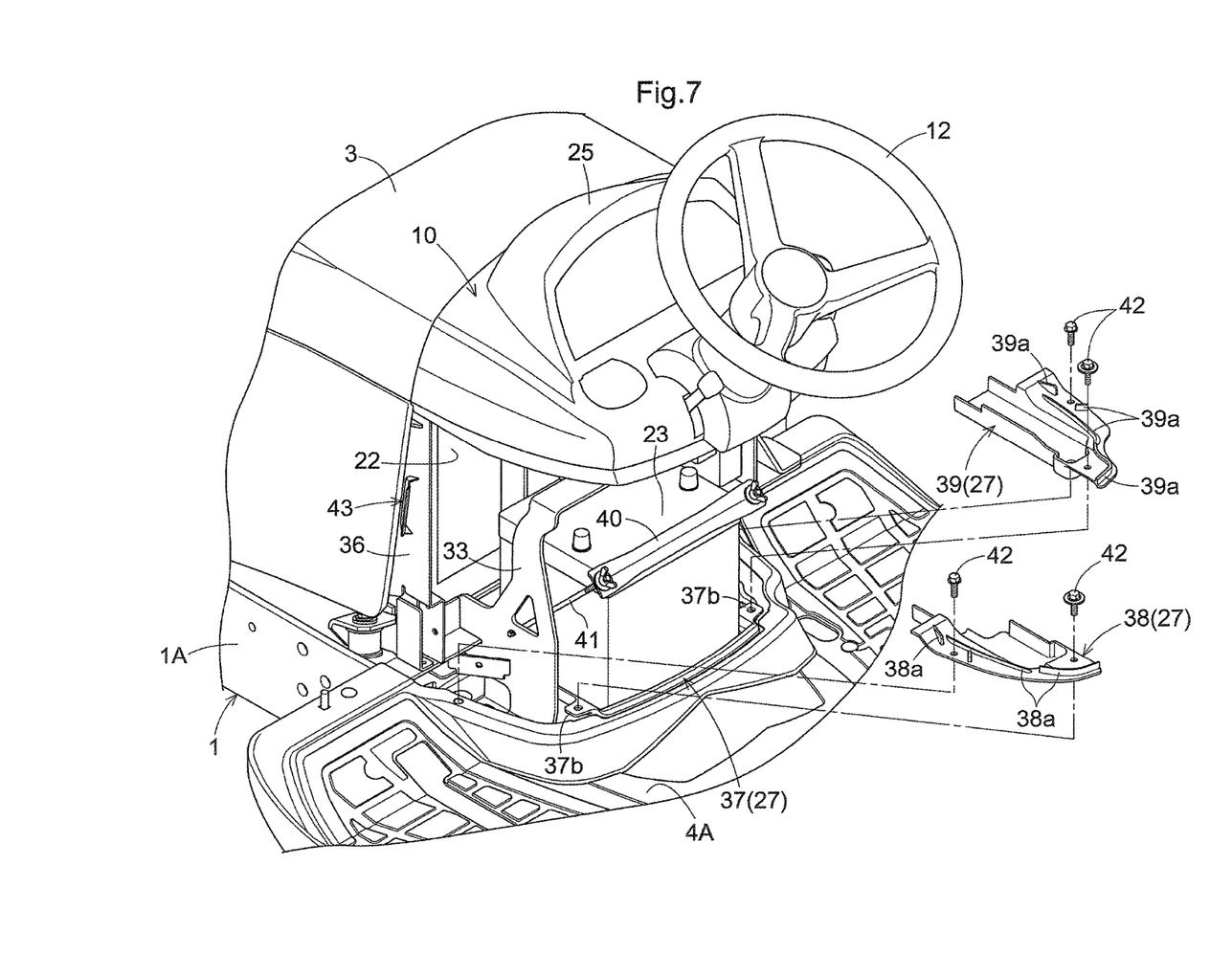
FIG. 7 is an exploded perspective view showing a left separate member and a right separate member being removed.
Figure 8:
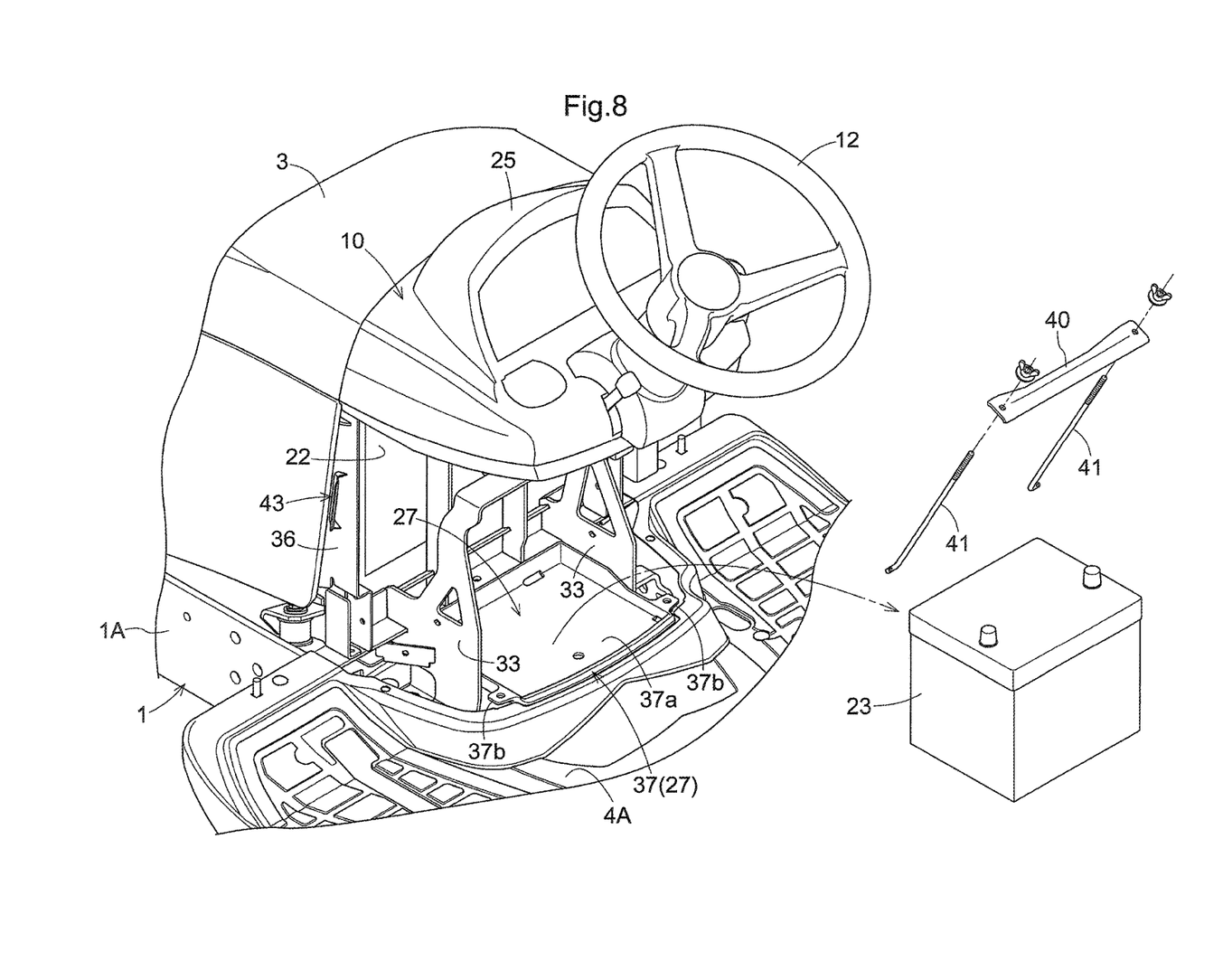
FIG. 8 is an exploded perspective view showing a battery being removed.
Figure 9:
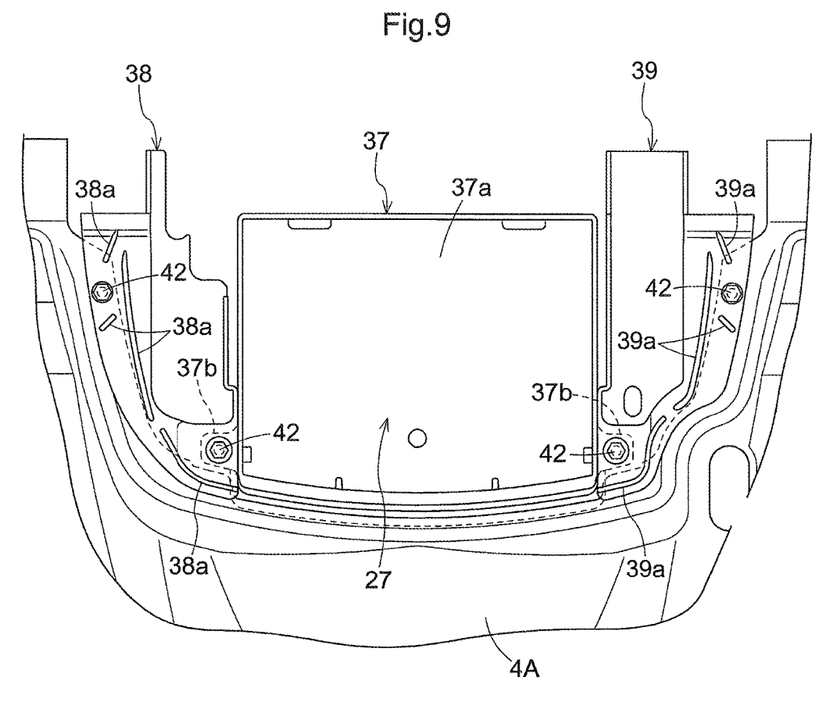
FIG. 9 is a plan view showing the battery mount.
Figure 10:
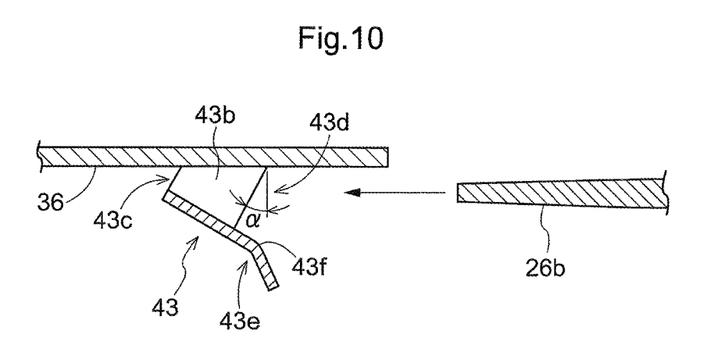
FIG. 10 is a plan view in section showing a guide portion.

As shown in FIG. 4 and FIG. 6 and FIG. 10, each of the right side plate 36 and the left side plate 36 has a guide portion 43 into which the lower panel 26 can be inserted. At right and left portions of the lower panel 26, there are formed inserting portions 26b that can be inserted into the respective guide portions 43.

Each guide portion 43 is formed of a metal plate. The guide portion 43 is fixed (e.g. fixed by welding) to the side plate 36 via an upper attaching root portion 43a and a lower attaching root portion 43b. As best shown in FIG. 10, a front end opening of the guide portion 43 functions as a holding portion 43c for holding the inserting portion 26b. A rear end opening of the guide portion 43 functions as an entrance 43d which the inserting portion 26b enters. The guide portion 43 is configured such that the entrance 43d is formed wide and the holding portion 43c is formed narrow, with respect to the vertical direction and the vehicle body right/left direction. With this arrangement, when the lower panel 26 is to be attached, the inserting portion 26b can be inserted easily through the entrance 43d to the guide portion 43. Further, with the inserting portion 26b inserted into the guide portion 43, the inserting portion 26b can be held in a stable manner by the holding portion 43c.

With bending of the upper attaching root portion 43a and the lower attaching root portion 43b, with respect to the vertical direction, the entrance 43d is formed wide and the holding portion 43c is formed narrow. With a slope of the upper attaching root portion 43a and the lower attaching root portion 43b (the slope "a" relative to the vehicle body right/left direction), the entrance 43d is formed wide and the holding portion 43c is formed narrow, with respect to the vehicle body right/left direction.

The guide portion 43 further includes a rear extending portion 43e that extends with a slope away from the side plate 36 toward the rear end. With this arrangement, the inserting portion 26b can be readily guided to the entrance 43d. At the rear extending portion 43e, a bent portion 43f is provided. With this, the inserting portion 26b can be guided even more easily to the entrance 43d and also increase of the strength of the rear extending portion 43e can be provided.

Incidentally, though not shown, at the guide portion 43, there can be provided a front extending portion that extends with a slope to approach the side plate 36 toward the front side. In this case, the front extending portion can be bent to the vehicle body inner side or the front extending portion can be bent to the vehicle body outer side.

Other Embodiments

Next, other embodiments will be described. The respective other embodiments below, unless contradiction occurs, can be applied to the foregoing embodiment in a plurality of combinations.

(1) In the foregoing embodiment, the battery deck 27 is divided into three parts (mounting member 37, left separate member 38, right separate member 39). Instead thereof, the battery 23 can be divided into two parts, or four or more parts.

(2) In the foregoing embodiment, the left separate member 38 and the right separate member 39 are connected to the mounting member 37 with the bolts 42, with the left separate member 38 and the right separate member 39 being superposed on the mounting member 37. Instead thereof, with the mounting member 37 being superposed on the left separate member 38 and the right separate member 39, the left separate member 38 and the right separate member 39 can be connected to the mounting member 37 with the bolts 42.

(3) In the foregoing embodiment, the battery mount 27 is divided into the left separate member 38 and the right separate member 39, at portions thereof that the respective leg portions 33 extend through. Instead thereof, the battery mount 27 can be configured to be divided at any other portions than such portions.

(4) In the foregoing embodiment, a tractor is recited as an example of the work vehicle. However, the work vehicle is not limited thereto. The work vehicle can be other work vehicles such as a combine and a rice transplanter. And, the work vehicle can be a civil engineering work vehicle, other than an agricultural work vehicle.

What is claimed is:

1. A work vehicle comprising:
   a driver's seat to be seated by a driver;
   a front control tower provided forwardly of the driver's seat;
   a battery accommodated inside the front control tower; and
   a bottom member that provides a bottom of the front control tower, the battery being mounted on the bottom member,
   wherein the bottom member includes a mounting member on which the battery is mounted, and a separate member separable from the mounting member when the battery is mounted on the mounting member, and
   wherein the mounting member is positioned partially co-planar with the separate member.

2. The work vehicle according to claim 1, wherein the separate member is releasably connected to the mounting member by a connector device when the separate member is superposed on the mounting member.

3. The work vehicle according to claim 1, further comprising:
   a steering wheel that is disposed erect on the front control tower for steering operation of a vehicle body; and
   a steering-wheel post that supports the steering wheel;
   wherein the steering-wheel post includes a pair of right and left leg portions that extend in a vertical direction through the bottom member, the bottom member being separable into the mounting member and the separate member at a portion where one of the leg portions extend through the bottom member.

4. The work vehicle according to claim 1, further comprising:
   a step that is provided between the front control tower and the driver's seat, a front end portion of the step being superposed on a rear end portion of the mounting member.

5. The work vehicle according to claim 1, further comprising:
   a step that is provided between the front control tower and the driver's seat, wherein:
   the separate member includes a left separate member on the left side of the mounting member and a right separate member on the right side of the mounting member;
   the left separate member covers a gap between a left side portion of the mounting member and a front end portion of the step; and
   the right separate member covers a gap between a right side portion of the mounting member and the front end portion of the step.

6. The work vehicle according to claim 1, wherein:
   the front control tower includes a detachable lower panel for covering the battery from the driver's seat side; and
   the separate member includes a guide portion for guiding attachment/detachment of the lower panel.

7. The work vehicle according to claim 1, further comprising:
   a steering wheel disposed erect on the front control tower for steering operation of a vehicle body; and
   a steering-wheel post that supports the steering wheel;
   wherein the steering-wheel post has an inverted U-letter shape comprising a pair of right and left leg portions that extend in a vertical direction through the bottom member and a connecting portion interconnecting the respective leg portions across the battery; and
   in each of the leg portions, there is formed a connecting element to which a stay of the battery is to be fixed.

8. A work vehicle comprising:
   a driver's seat to be seated by a driver;
   a front control tower provided forwardly of the driver's seat;
   a battery accommodated inside the front control tower;
   a bottom member that provides a bottom of the front control tower, the battery being mounted on the bottom member, wherein the bottom member includes a mounting member on which the battery is mounted, and a separate member separable from the mounting member when the battery is mounted on the mounting member; and
   a stay and a pair of right and left fixing rods, wherein when the battery is mounted on the mounting member, the stay and the fixing rods are configured to act on a top portion of the battery to fix the battery in position.

9. The work vehicle according to claim 8, wherein the separate member is releasably connected to the mounting member by a connector device when the separate member is superposed on the mounting member.

10. The work vehicle according to claim 8, further comprising:
    a steering wheel that is disposed erect on the front control tower for steering operation of a vehicle body; and
    a steering-wheel post that supports the steering wheel;
    wherein the steering-wheel post includes a pair of right and left leg portions that extend in a vertical direction through the bottom member, the bottom member being separable into the mounting member and the separate member at a portion where one of the leg portions extend through the bottom member.

11. The work vehicle according to claim 8, further comprising:
    a step that is provided between the front control tower and the driver's seat, a front end portion of the step being superposed on a rear end portion of the mounting member.

12. The work vehicle according to claim 8, further comprising:
    a step that is provided between the front control tower and the driver's seat, wherein:
    the separate member includes a left separate member on the left side of the mounting member and a right separate member on the right side of the mounting member;
    the left separate member covers a gap between a left side portion of the mounting member and a front end portion of the step; and
    the right separate member covers a gap between a right side portion of the mounting member and the front end portion of the step.

13. The work vehicle according to claim 8, wherein:
    the front control tower includes a detachable lower panel for covering the battery from the driver's seat side; and
    the separate member includes a guide portion for guiding attachment/detachment of the lower panel.

14. The work vehicle according to claim 8, further comprising:
    a steering wheel disposed erect on the front control tower for steering operation of a vehicle body; and
    a steering-wheel post that supports the steering wheel;
    wherein the steering-wheel post has an inverted U-letter shape comprising a pair of right and left leg portions that extend in a vertical direction through the bottom member and a connecting portion interconnecting the respective leg portions across the battery; and in each of the leg portions, there is formed a connecting element to which the stay of the battery is to be fixed.

\* \* \* \* \*